United States Patent [19]

Shields

[11] Patent Number: 4,497,230
[45] Date of Patent: Feb. 5, 1985

[54] SHEAR WITH CUTTING HEIGHT ADJUSTMENT

[76] Inventor: D. Leet Shields, P.O. Box 125, Leetsdale, Pa. 15056

[21] Appl. No.: 370,206

[22] Filed: Apr. 21, 1982

[51] Int. Cl.³ .......................... B26D 5/08; B23D 25/04
[52] U.S. Cl. ........................................ 83/600; 83/607; 83/563; 83/564; 83/318; 83/320
[58] Field of Search ................ 83/318, 320, 563, 564, 83/284, 597, 600, 607, 926 D

[56] References Cited

U.S. PATENT DOCUMENTS

| | | | |
|---|---|---|---|
| 1,559,082 | 10/1925 | Friederici | 83/600 X |
| 1,638,483 | 7/1927 | Giandonato | 83/597 X |
| 2,641,942 | 6/1953 | Mueller | 83/600 X |
| 3,418,874 | 10/1968 | Lees | 83/600 X |
| 4,369,683 | 1/1983 | Bieg | 83/320 X |
| 4,385,538 | 5/1983 | Bieri | 83/600 X |

OTHER PUBLICATIONS

Drawing No. 122-0-01, dated 6/18/80, entitled "Test Coupon Cutter" drawn by D. L. S.

*Primary Examiner*—Paul A. Bell
*Assistant Examiner*—Taylor J. Ross
*Attorney, Agent, or Firm*—Webb, Burden, Robinson & Webb

[57] ABSTRACT

A shear having a main frame with a horizontal shaft and a shear frame pivotally attached to the shaft for adjustment relative to the main frame. The shear frame includes a pair of spaced members and a king pin is rotatably supported on the spaced members. A master shearing arm is nonrotatably mounted on the king pin and a subordinate shearing arm is rotatably mounted on the king pin and a cutting knife is carried on each shearing arm. The master shearing arm and the subordinate shearing arm are connected by a hydraulic cylinder and a piston rod to move the shearing arms between an open position and a closed position to cut workpieces passing between the cutting knives.

10 Claims, 7 Drawing Figures

SHEAR WITH CUTTING HEIGHT ADJUSTMENT

BACKGROUND OF THE INVENTION

The invention is directed to a shear for cutting an elongated workpiece such as wire or rod into predetermined lengths as the workpiece moves between work stations or between a work station and a storage area. The workpiece must be cut into predetermined lengths for subsequent treatment or sale. In a preferred embodiment, the invention is a traveling shear which accelerates rapidly until it is moving at the same rate of speed as the workpiece so that when a cut is made, there is no relative linear movement between the cutting heads on the shear and the workpiece. After a cut is made, the traveling shear is returned to the starting position in preparation for the next cut. The shear may also be operated in a stationary position if desired.

DESCRIPTION OF THE PRIOR ART

In prior art shears, cutting is effected by pincher blades or by alligator shears wherein only one arm is movable to cut the stock. Additionally, in prior art shears the position of the cutting heads is not adjustable relative to the pass line of the workpiece through the shear.

SUMMARY OF THE INVENTION

The invention is directed to a shear having a pair of hydraulically operated shearing arms for cutting rod or wire. When the shear is used as a traveling shear, it is accelerated in the direction of movement of the workpiece until it is moving at the same speed as the workpiece at which point the shearing arms are closed so that the cutting heads cut off the workpiece. The position of the shearing arms may be adjusted both vertically and angularly relative to the pass line of the workpiece so that the grooves in the cutting heads are directly in line with the pass line to sever the workpiece.

DESCRIPTION OF THE PREFERRED EMBODIMENTS

Figure 1:
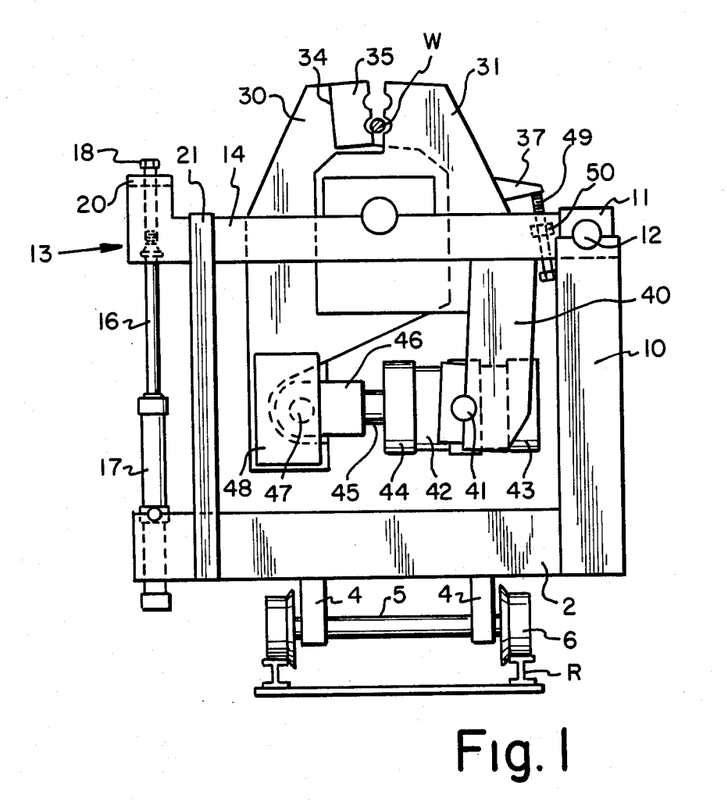
FIG. 1 is an end elevation of a traveling shear according to the invention.
Figure 2:
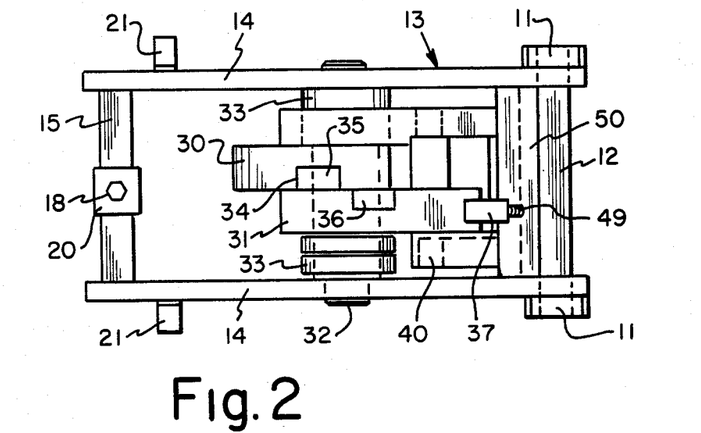
FIG. 2 is a plan view of the shear shown in FIG. 1.
Figure 3:
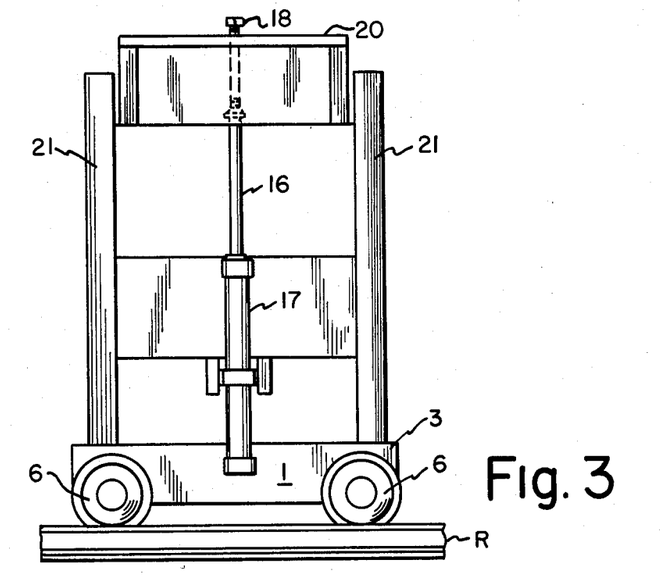
FIG. 3 is a side elevation of the shear shown in FIG. 1.

The shear shown in FIGS. 1-3 has a main frame 1 having end members 2 and side members 3 which are welded to members 2. The main frame is supported on a pair of trucks by two pairs of spaced brackets 4 which depend from end members 2. An axle 5 is journaled in each pair of brackets and flanged wheels 6 are mounted on each axle 5. Wheels 6 travel along spaced rails R of a track which extends parallel to the direction of movement of workpieces to be sheared. The wheels permit the shear to be rapidly accelerated along rails R until the shear attains the same linear speed as the workpieces to be cut so that there is no relative linear movement between the workpieces and the shear during cutting. The trucks and mounting brackets are standard items which are well known to those skilled in the art and form no part of the invention.

The main frame includes spaced parallel columns 10 which extend upwardly from and are welded to an end member 2. The columns are connected approximately midway of their length by a brace member (not shown) to add rigidity to the main frame. The upper end of each column 10 supports a block 11 which nonrotatably supports a shaft 12 which overlies a main frame side member 3.

A shear frame 13 includes a pair of parallel members 14 which have one end pivotally mounted on shaft 12 and which have their opposite ends welded to a cross member 15. Members 14 overlie members 2 of main frame 1. Cross member 15 is supported by the upper end of a piston rod 16 extending from a hydraulic cylinder 17. The lower end of hydraulic cylinder 17 is pivotally attached to a main frame side member 3 by a trunnion mount. A bolt 18 is threaded in an extension 20 on cross member 15 and extends downwardly therethrough so that the lower end of the bolt contacts the upper end of piston rod 16. Vertical movement of piston rod 16 will rotate shear frame 13 about a shaft 12 to change the position of the cutting knives relative to the pass line of the workpiece. Since bolt 18 is threaded through the extension on cross member 15, adjustment of the bolt in extension 20 will pivot shear frame 13 about shaft 12. This movement provides a fine adjustment of the angular position of the cutting knives on the shearing arms relative to the pass line of the workpieces. A vertical gib member 21 is welded to the outer surface of each frame member 2 and extends upwardly adjacent to shear frame 13 to act as a guide for the shear frame during pivotal adjustment thereof about shaft 12.

The shearing mechanism supported on shear frame 13 consists of a subordinate shearing arm 30 and a master shearing arm 31, both of which are mounted about the axis of a king pin 32. As will be seen in FIG. 2 of the drawings, bushings 33 are located between the nonfacing surfaces of the shearing arms and members 14 of shear frame 13. The opposite ends of king pin 32 are rotatably supported in bearing members located on members 14 of shear frame 13. Master shearing arm 31 is nonrotatably supported on king pin 32, and subordinate shearing arm 30 is rotatably supported on king pin 32.

Each shearing arm has a knife pocket 34 formed therein to carry a cutting knife. A cutting knife 35 is mounted in pocket 34 of shearing arm 30 and a cutting knife 36 is mounted in pocket 34 of shearing arm 31. A lug 37 is welded to master shearing arm 31 for a purpose to be described hereinafter. Depending members 40 are welded to master shearing arm 31 and act as weights to rotate the shearing arms and king pin 32 in a clockwise direction relative to the shear frame as viewed in FIG. 1 of the drawings. Additionally, depending members 40 support a cylinder pivot pin 41. A hydraulic cylinder 42 having cylinder heads 43 and 44 is pivotally attached to the lower ends of members 40 by cylinder pivot pin 41. A piston rod 45 extends outwardly from hydraulic cylinder 42 through cylinder head 44 and has an eye or clevis 46 attached at its free end. Eye 46 is pivotally attached by a pin 47 to a bracket 48 fixed to the lower end of subordinate shearing arm 30.

Master shearing arm 31 is free to rotate in a counterclockwise direction as seen in FIG. 1 of the drawings in response to the net force from hydraulic cylinder 42 and resistance to shear by the workpiece as shearing takes place. The shear consisting of the master shearing arm and the subordinate shearing arm and other elements carried thereon, such as the hydraulic cylinder and piston rod, thus seeks to center itself about the center of resistance to shear the workpiece.

The position of the cutting knives when the shear is at rest, which is the position at which the cut is begun, is adjustable to accommodate factors such as the configuration of the cutting knives, the diameter of the workpiece being cut and the experience with the use of the machine. Adjustment is accomplished by piston rod 16 and bolt 18 as explained above and by a bolt contacting lug 37 as explained hereinafter.

In operation, the opening between cutting knives 35 and 36 on the shearing arms is controlled by the contracted position of piston rod 45 in cylinder 42. The angular position and thus the height of both shearing heads or knives relative to the pass line of a workpiece W is adjusted by cylinder 17 and piston rod 16 and by bolt 18. This adjusts the height of the shearing arms through an arc centered in the axis of shaft 12. As stated, the weight of members 40 tends to rotate the shearing arms clockwise relative to shear frame 13 as seen in FIG. 1 of the drawings, and the extent of this rotary movement is controlled by contact between lug 37 and a bolt 49 which is threaded through a cross member 50 extending between members 14 on shear frame 13 adjacent to shaft 12. Bolt 49 extends upwardly through a threaded hole in cross member 50 into a position where the end of the bolt contacts the lower surface of lug 37 to stop rotation of the shearing arms in the clockwise direction about king pin 32. Adjustment of bolt 49 is essentially a horizontal adjustment which determines the location of the grooves in the cutting knives relative to the pass line of the workpieces passing through the shearing heads. The coordinated use of adjusting bolt 18 and stop bolt 49 provide correct location of the grooves relative to the pass line of the workpiece.

A second embodiment of the invention is shown in FIGS. 4-7 of the drawings wherein like reference numerals indicate like parts as in the embodiment shown in FIGS. 1-3. The shear in the second embodiment includes a main frame 1 mounted on wheels 6. Each wheel is supported on an axle carried in bearings in a journal 60 which is supported in a lower side member 61 of main frame 1. The side members of the main frame are welded to lower end members 62. The main frame also includes vertical members 63 and 64 which are welded to the lower members 61 and 62 and extend upwardly therefrom. An L-shaped horizontal frame member 65 is welded to the upper ends of members 63 and overlies an end member 62. A vertical member 66 is welded to and extends upwardly from the horizontal portion of L-shaped member 65. At the opposite end of the machine vertical member 67 is welded to the upper ends of vertical members 64.

When the shear is to be used in the stationary position or when it is not used, a pin 51 is dropped through a hole in a plate 52 which is welded to the main frame and an aligned hole in the upper channel 53 of the I beam forming rail R. The purpose of the pin is to hold the shear assembly stationary with respect to the rails when it is not in use and thereby prevent it from rolling along the track and causing an accident. The shear is shown in the stationary position with pin 51 in place in FIG. 4 of the drawings. Of course, the shear may be constructed without wheels 6 if it is only intended for use in the stationary position.

Figure 5:
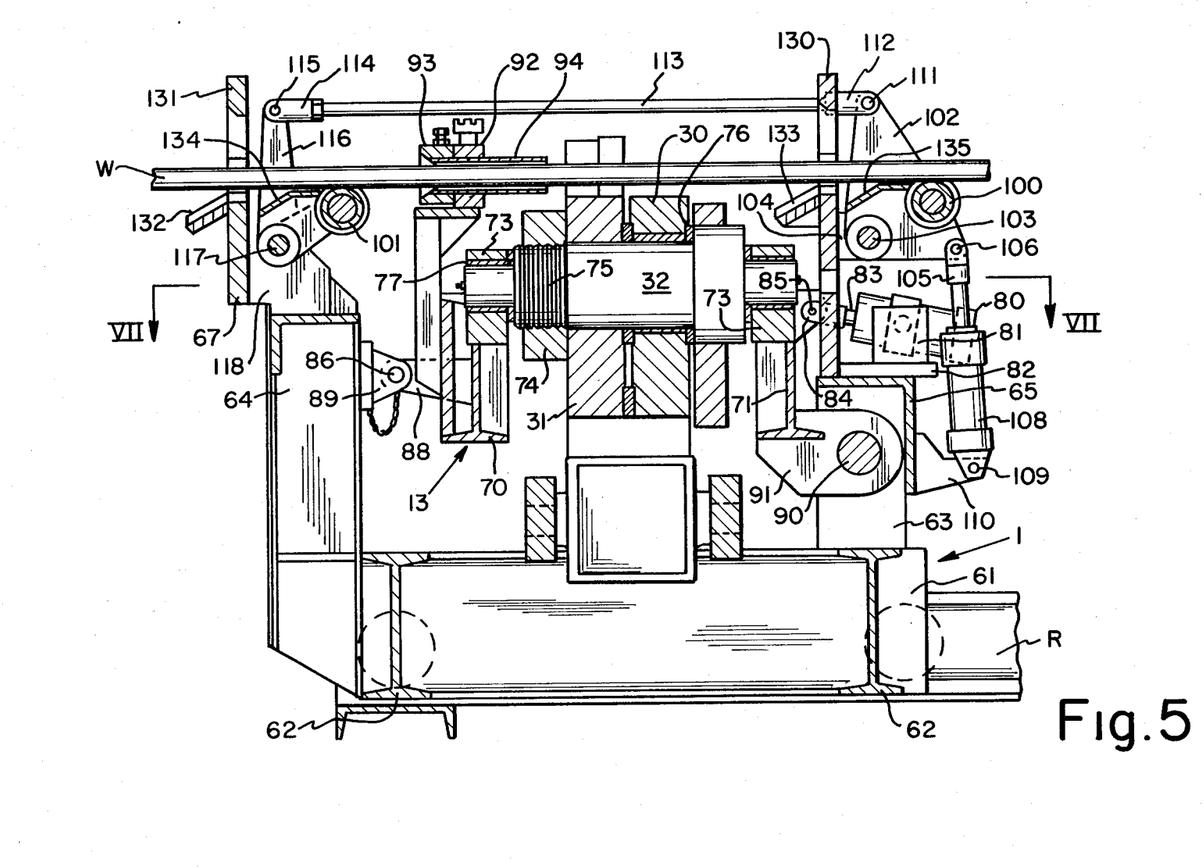
FIG. 5 is a section on line V—V of FIG. 4.

Shear frame 13 consists of a pair of parallel spaced beams 70 and 71 located above and parallel with frame members 62 of the main frame. The end of beams 70 and 71 are welded to cross members 72 which are located above and parallel with side members 61 of the main frame. King pin 32 is rotatably mounted in blocks 73 which are supported on beams 70 and 71. With reference to FIG. 5 of the drawings, it will be seen that collar 74 is threaded on a threaded end portion 75 of king pin 32 to pull the king pin up relatively tightly against the opposite abutting face of collar 76. The king pin is provided with a collar 77 at each end so that the king pin can rotate in blocks 73. Shearing arms 30 and 31 are mounted on king pin 32 in the same manner as in the embodiment of FIGS. 1-3 of the drawings, and shearing arm 31 is the master shearing arm and shearing arm 30 is the subordinate shearing arm.

Figure 6:
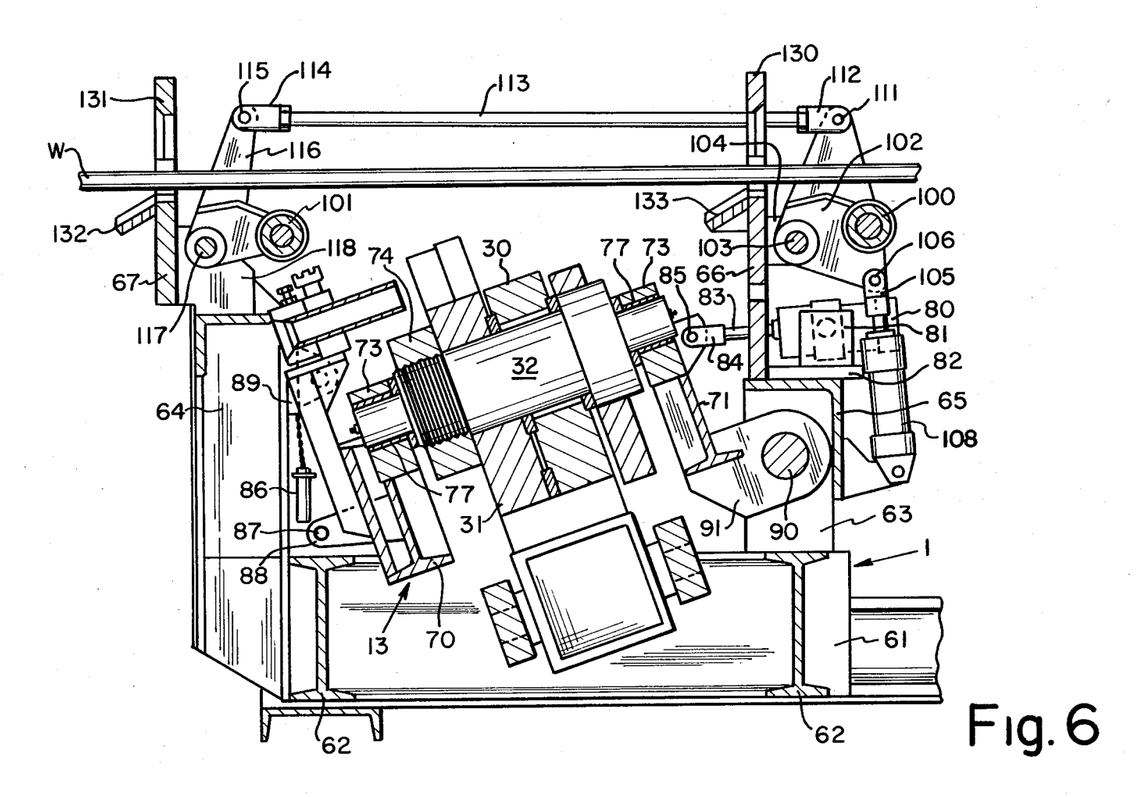
FIG. 6 is a view similar to FIG. 5 with the shearing mechanism in a tilted position.
Figure 7:
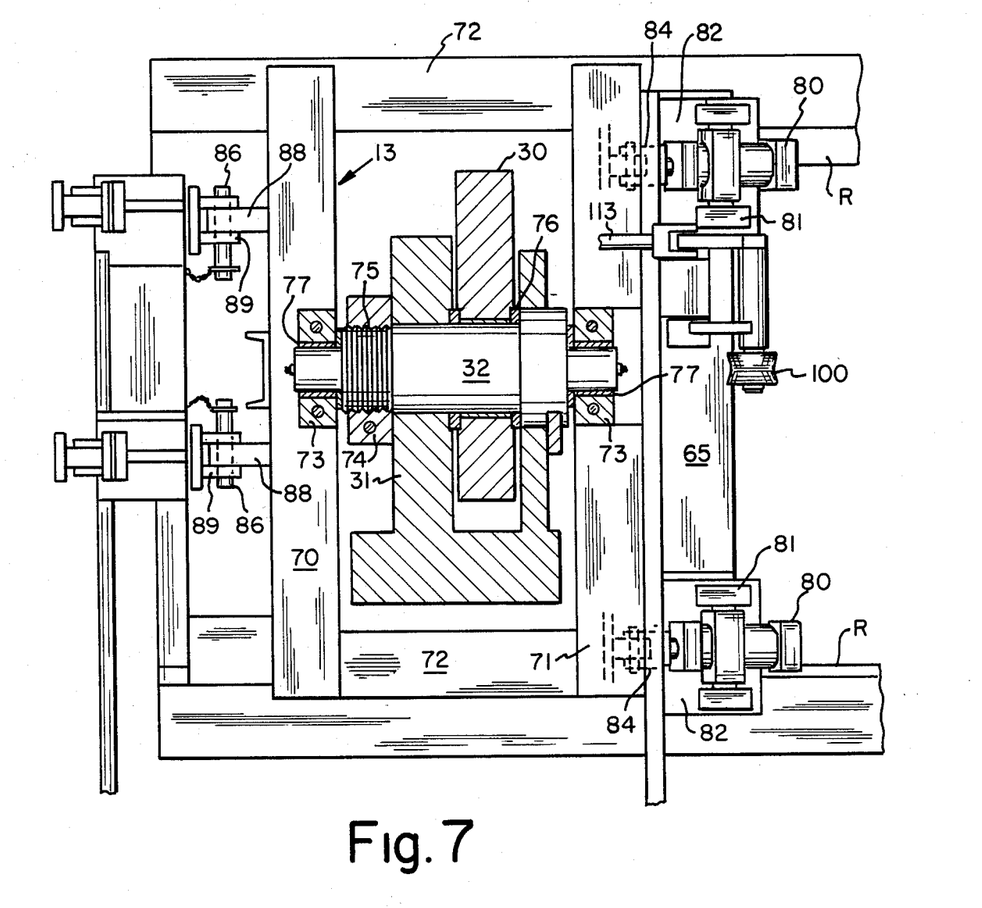
FIG. 7 is a section on line VII—VII of FIG. 5.

The shear frame 13 may be tilted as shown in FIG. 6 to remove the cutting knives of the shearing arms from the pass line of workpiece W. Tilting is effected by a pair of hydraulic cylinders 80 which are pivotally mounted in brackets 81 supported on plates 82 welded to the horizontal leg of L-shaped main frame member 65. A piston rod 83 extends out of each hydraulic cylinder 80 and is attached to a clevis 84 which is pivotally mounted by a pin 85 to a lug which is welded to beam 71. When the shear frame is in the upper cutting position, piston rods 83 are retracted into hydraulic cylinders 80, and a pair of lock pins 86 hold the shear frame in place. Each lock pin 86 is inserted through a hole 87 in a lug 88 which is welded onto beam 70 and through a complementary hole in lug 89 which is welded onto vertical main frame member 64. When the shear frame is to be tilted to remove the cutting knives from the pass line of the workpiece, pins 86 are removed from the holes in the lugs. Piston rods 83 are then extended from hydraulic cylinders 80 which pivot shear frame 13 about pivot rod 90 which is supported by vertical members 63 of the main frame. Lugs 91 embrace pivot rod 90 and are welded to beam 71 of shear frame 13 to support the shear frame on the main frame.

When the shear frame is tilted into the position shown in FIG. 6 of the drawings, workpiece support rollers 100 and 101 may also be dropped away from the pass line of the workpieces in order to provide clearance for the workpiece to pass through the space previously occupied by the shearing arms. The rollers are shown in the dropped position in FIG. 6. Roller 100 is rotatably mounted on a crank member 102 which is pivoted about a pin 103 supported in a lug 104 welded onto vertical member 66 of the main frame. The lower corner of crank member 102 is attached to a clevis 105 by a pin 106. The clevis is supported on the end of a piston rod 107 which extends out of a hydraulic cylinder 108. The opposite end of hydraulic cylinder 108 is supported by a pin 109 which is mounted on a lug 110 which is welded to vertical member 63 of main frame 1. The upper corner of crank member 102 supports a pin 111 which is connected to a tie rod end 112. Tie rod end 112 is threaded to a tie rod 113. A tie rod end 114 is threaded to the opposite end of tie rod 113 and is connected to a bell crank 116 by a pin 115. Bell crank 116 is pivotally supported by a pin 117 on a lug 118 which is welded to vertical member 67 of main frame 1. Roller 101 is rotatably mounted on a corner of bell crank 116 to support the workpieces as they pass through the shear. When it is desired to rotate the rollers out of the pass line of the workpieces, piston rod 107 is retracted into cylinder 108 which pivots crank member 102 about pivot pin 103 to lower roller 100. Simultaneously, tie rod 113 pivots bell crank 116 about pin 117 to lower roller 101 out of the pass line of the workpieces. It will be understood that rollers 100 and 101 may be left in the pass line if desired independent of the position of the shearing arms for directing the workpieces transversely onto skid bars and then into a collection rack for further handling or for axial movement of the workpieces.

As will be seen in FIG. 5 of the drawings, the shear includes a guide attached to shear frame 13 for directing workpieces passing through the shear. The guide consists of first adjustable collar 92, a second adjustable collar 93 and a tube 94 to receive the workpieces. The tube size may be changed to accommodate wires or rods of different diameters. The entry end of adjustable collar 93 is formed in the shape of a funnel in order to permit wire or rod to be easily guided into tube 94.

Figure 4:
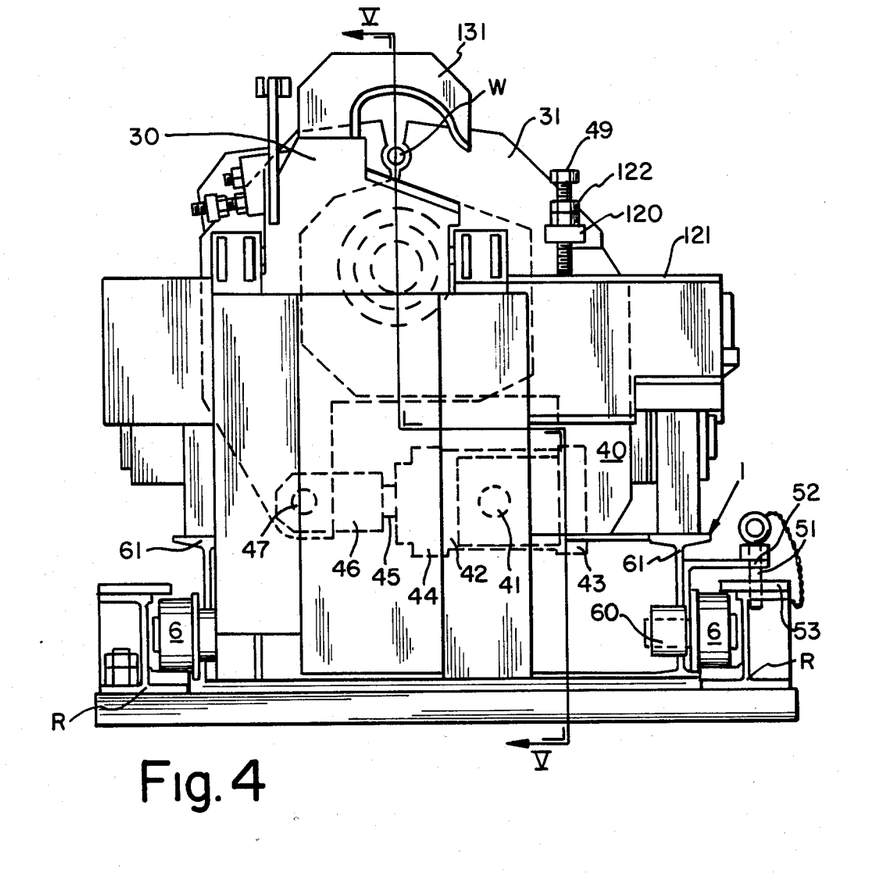
FIG. 4 is an end elevation of a second embodiment of a shear according to the invention.

In the embodiment of FIGS. 4–7, master shearing arm 31 has depending members 40 welded thereto which support cylinder pivot pin 41 to mount hydraulic cylinder 42 having cylinder heads 43 and 44. A rod 45 extends through cylinder head 44 and is connected to an eye or clevis 46 which is attached to a pivot pin 47 mounted in a bracket 48 at the lower end of subordinate shearing arm 30. Depending members 40 act as weights to rotate master shearing arms 31, subordinate shearing arm 30 and king pin 32 in a clockwise direction as shown in FIG. 4 of the drawings in the same manner as in the embodiment of FIGS. 1–3. A stop bolt 49 is threaded downwardly through a threaded opening through a lug 120 which is welded to master shearing arm 31. The lower end of stop bolt 49 contacts the upper surface of a horizontal plate 121 which is attached to shear frame 13. A pair of lock nuts 122 are provided on stop bolt 49 above lug 120 to insure that the stop bolt will remain in position after it is adjusted. The purpose of stop bolt 49 is to arrest the clockwise rotary movement of the shearing arms and king pin 32 which is caused by members 40 depending from master shearing arm 31.

As shown in FIGS. 4–6 of the drawings, a pair of inverted J-shaped members 130 and 131 extend upwardly from vertical members 66 and 67 of the main frame in order to prevent the workpieces from kicking out of the shear. The base of each J-shaped member overlies the workpieces as they travel along the pass line through the shear. Vertical members 66 and 67 are provided with angled guide members 132 and 133 located below the pass line of the workpiece in order to direct the end of a workpiece onto rollers 100 or 101. Additionally, bell crank 116 is provided with an angled guide member 134, and crank member 102 is provided with an angled guide member 135.

While preferred embodiments of the invention have been described herein, it is to be understood that they may be embodied within the scope of the appended claims.

I claim:

1. A shear having a main frame including base members and spaced vertical members fixed to said base members and extending upwardly therefrom, a shaft extending between said vertical members, a shear frame located above said base members, said shear frame including parallel spaced members pivotally attached to said shaft, a king pin extending between and rotatably supported on said parallel spaced members of said shear frame, a master shearing arm nonrotatably supported on said king pin, a subordinate shearing arm rotatably supported on said king pin in juxtaposition to said master shearing arm, cutting means on each of said shearing arms and actuating means connecting said master shearing arm and said subordinate shearing arm to move said cutting means on said shearing arms between an open position and a closed position to cut a workpiece passing between said cutting means.

2. A shear as set forth in claim 1 including freely depending members on said master shearing arm to rotate said master shearing arm, said subordinate shearing arm and said king pin relative to said shear frame in one direction only, adjustable stop means between said master shearing arm and said shear frame to stop rotation of said shearing arms and said king pin by said freely depending members.

3. A shear as set forth in claim 2 wherein said adjustable stop means is a lug welded to said master shearing arm and a bolt threadedly connected to said shear frame and in contact with said lug, whereby the extend of said rotary movement of said shearing arms and said king pin relative to said shear frame is adjusted by said bolt.

4. A shear as set forth in claim 2 wherein said adjustable stop means is a lug welded to said master shearing arm, said lug having a threaded opening therethrough, a stop bolt extending downwardly through said threaded opening in said lug, the lower end of said stop bolt contacting said shear frame, whereby the extent of said rotary movement of said shearing arms and said king pin relative to said shear frame is adjusted by said bolt.

5. A shear as set forth in claim 1 wherein said actuating means connecting said shearing arms to move said cutting means on said shearing arms between an open position and a closed position is a hydraulic cylinder pivotally connected to one of said shearing arms, a piston rod extending from an end of said hydraulic cylinder and a clevis having a first end attached to the free end of said piston rod, the second end of said clevis pivotally attached to the other shearing arm, whereby extension of said piston rod out of said hydraulic cylinder moves said cutting means on said shearing arms to the closed position to cut a workpiece and retraction of said piston rod into said hydraulic cylinder moves said cutting means on said shearing arms to an open position.

6. A shear as set forth in claim 1 or 2 including tilt means mounted on said main frame and in contact with said shear frame to pivot said shear frame about said shaft, whereby said cutting means on said shearing arms may be tilted out of the pass line of workpieces passing through said shear.

7. A shear as set forth in claim 6 wherein said tilt means is at least one hydraulic cylinder pivotally mounted on said main frame, a piston rod extending from an end of said hydraulic cylinder and the free end of said piston rod engaging said shear frame, whereby movement of said piston rod in said hydraulic cylinder pivots said shear frame about said shaft to rotate said cutting means on said shearing arms out of the pass line of workpieces passing through said shear.

8. A shear as set forth in claim 1 including a plurality of wheels mounted on said base members, whereby said shear is adapted to travel along rails and to shear a workpiece while traveling.

9. A shear having a main frame including base members and spaced vertical members fixed to said base members and extending upwardly therefrom, a shaft extending between said vertical members, a shear frame located above said base members, said shear frame including parallel spaced members pivotally attached to said shaft, a king pin extending between and rotatably supported on said parallel spaced members of said shear frame, a master shearing arm having spaced substantially parallel members nonrotatably connected to said king pin, a subordinate shearing arm rotatably supported on said king pin between said spaced substantially parallel members of said master shearing arm, cutting means on each of said spaced parallel members of said master shearing arm and said subordinate shearing arm and actuating means connecting said master shearing arm and said subordinate shearing arm to move said cutting means on said master shearing arm and said subordinate shearing arm between an open position and a closed position to cut a workpiece located between said cutting means.

10. A shear as set forth in claim 9 including at least one freely depending member on said master shearing arm to rotate said master shearing arm, said subordinate shearing arm and said king pin relative to said shear frame and adjustable stop means between said master shearing arm and said shear frame to stop rotation of said shearing arms and said king pin by said freely depending member.

* * * * *

UNITED STATES PATENT AND TRADEMARK OFFICE
CERTIFICATE OF CORRECTION

PATENT NO. : 4,497,230

DATED : February 5, 1985

INVENTOR(S) : D. Leet Shields

It is certified that error appears in the above-identified patent and that said Letters Patent is hereby corrected as shown below:

Column 5 Line 30 "arms" should read --arm--.

Claim 3 - Column 6 Line 23 "extend" should read --extent--.

Signed and Sealed this

Eleventh Day of June 1985

[SEAL]

Attest:

DONALD J. QUIGG

Attesting Officer     Acting Commissioner of Patents and Trademarks